United States Patent
Uskert et al.

(10) Patent No.: US 8,956,105 B2
(45) Date of Patent: Feb. 17, 2015

(54) TURBINE VANE FOR GAS TURBINE ENGINE

(75) Inventors: Richard C. Uskert, Noblesville, IN (US); Ted Joseph Freeman, Avon, IN (US); David J. Thomas, Brownsburg, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1168 days.

(21) Appl. No.: 12/643,493

(22) Filed: Dec. 21, 2009

(65) Prior Publication Data

US 2010/0166565 A1 Jul. 1, 2010

Related U.S. Application Data

(60) Provisional application No. 61/204,061, filed on Dec. 31, 2008.

(51) Int. Cl.
*F01D 9/06* (2006.01)
*F01D 5/18* (2006.01)
*F01D 5/10* (2006.01)
*F01D 5/28* (2006.01)

(52) U.S. Cl.
CPC ...... *F01D 5/188* (2013.01); *F01D 5/10* (2013.01); *F01D 5/189* (2013.01); *F01D 5/282* (2013.01); *Y02T 50/672* (2013.01); *Y02T 50/673* (2013.01); *Y02T 50/676* (2013.01)
USPC ........... 415/116; 415/115; 415/191; 415/200; 415/208.1; 415/208.2; 415/211.2; 416/96 R; 416/96 A; 416/97 R; 416/97 A; 416/226; 416/230; 416/233; 416/241 B

(58) Field of Classification Search
USPC ........... 415/115, 116, 191, 200, 208.1, 208.2, 415/211.2; 416/96 R, 96 A, 97 R, 97 A, 226, 416/229 R, 229 A, 230, 241 B, 232, 233
See application file for complete search history.

(56) References Cited

U.S. PATENT DOCUMENTS

| | | | |
|---|---|---|---|
| 2,843,355 A | 7/1958 | Findley | |
| 2,873,944 A * | 2/1959 | Wiese et al. | 416/96 A |
| 3,011,760 A | 12/1961 | Eckert | |
| 3,388,888 A * | 6/1968 | Kercher et al. | 415/115 |
| 3,647,316 A * | 3/1972 | Moskowitz | 416/97 R |
| 3,762,835 A | 10/1973 | Carlson et al. | |
| 3,950,113 A * | 4/1976 | Albrecht | 416/97 A |

(Continued)

FOREIGN PATENT DOCUMENTS

| | | |
|---|---|---|
| EP | 1 284 338 A2 | 2/2003 |
| EP | 1 626 162 A1 | 2/2006 |
| EP | 1 905 956 A2 | 4/2008 |

OTHER PUBLICATIONS

EP Search Report, EP 09015975.7, Rolls-Royce North American Technologies Inc., Feb. 14, 2013.

*Primary Examiner* — Christopher Verdier
(74) *Attorney, Agent, or Firm* — Krieg DeVault LLP

(57) ABSTRACT

A turbine vane for a gas turbine engine may include a composite airfoil structure. The composite airfoil structure may have an opening. The turbine vane may include a spar. The spar may have a body, which may be disposed within the opening. A standoff structure may be disposed within the opening. In some non-limiting embodiments, a cooling air gap may be defined between the body and an internal surface of the composite airfoil structure.

21 Claims, 8 Drawing Sheets

(56) References Cited

U.S. PATENT DOCUMENTS

| | | | |
|---|---|---|---|
| 4,040,159 A | 8/1977 | Darrow et al. | |
| 4,111,606 A | 9/1978 | Prewo | |
| 4,519,745 A * | 5/1985 | Rosman et al. | 416/96 A |
| 4,629,397 A * | 12/1986 | Schweitzer | 416/96 R |
| 5,013,216 A | 5/1991 | Bailey et al. | |
| 5,405,242 A * | 4/1995 | Auxier et al. | 415/115 |
| 5,449,273 A | 9/1995 | Hertel et al. | |
| 5,630,700 A | 5/1997 | Olsen et al. | |
| 5,820,337 A | 10/1998 | Jackson et al. | |
| 6,514,046 B1 * | 2/2003 | Morrison et al. | 416/229 A |
| 6,893,211 B1 | 5/2005 | Eibl et al. | |
| 7,131,816 B2 * | 11/2006 | Synnott et al. | 416/96 A |
| 7,422,417 B2 | 9/2008 | Landis | |
| 2006/0210399 A1 * | 9/2006 | Kitamura et al. | 416/97 R |
| 2007/0020105 A1 * | 1/2007 | Albrecht et al. | 416/224 |
| 2007/0258811 A1 * | 11/2007 | Shi et al. | 415/210.1 |
| 2008/0250641 A1 | 10/2008 | James et al. | |

* cited by examiner

TURBINE VANE FOR GAS TURBINE ENGINE

CROSS REFERENCE TO RELATED APPLICATIONS

The present application claims the benefit of U.S. Provisional Patent Application 61/204,061, filed Dec. 31, 2008, and is incorporated herein by reference.

FIELD OF THE INVENTION

The present invention relates to gas turbine engines, and, more particularly, to turbine vanes for gas turbine engines.

BACKGROUND

Gas turbine engines typically employ turbine vanes in one or more stages to control the flow of the hot combustion gases directed into turbine blades for extracting work from the hot gases. Some existing systems have various shortcomings, drawbacks, and disadvantages relative to certain applications. Accordingly, there remains a need for further contributions in this area of technology.

SUMMARY

The present invention provides a turbine vane for a gas turbine engine. The turbine vane may include a composite airfoil structure. The composite airfoil structure may have an opening. The turbine vane may include a spar. The spar may have a body, which may be disposed within the opening. A standoff structure may be disposed within the opening. In some non-limiting embodiments, a cooling air gap may be defined between the body and an internal surface of the composite airfoil structure.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
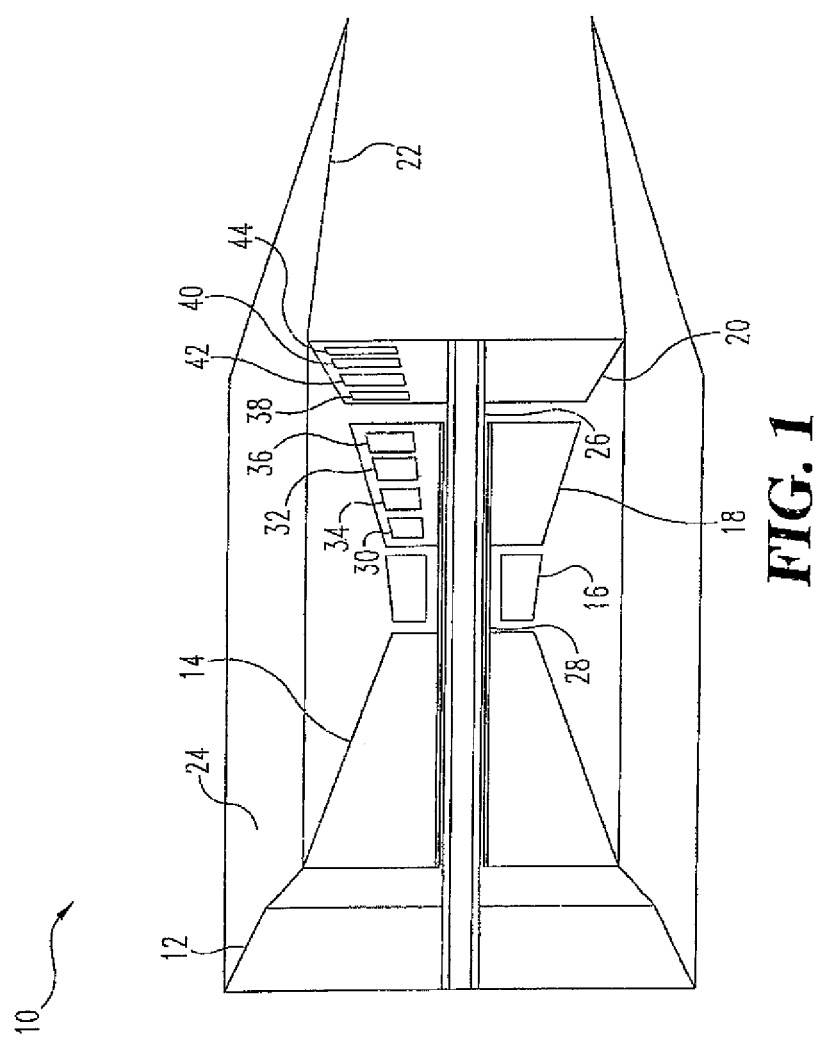
FIG. 1 schematically depicts a gas turbine engine in accordance with an embodiment of the present invention.

For purposes of promoting an understanding of the principles of the invention, reference will now be made to the embodiments illustrated in the drawings, and specific language will be used to describe the same. It will nonetheless be understood that no limitation of the scope of the invention is intended by the illustration and description of certain embodiments of the invention. In addition, any alterations and/or modifications of the illustrated and/or described embodiment(s) are contemplated as being within the scope of the present invention. Further, any other applications of the principles of the invention, as illustrated and/or described herein, as would normally occur to one skilled in the art to which the invention pertains, are contemplated as being within the scope of the present invention.

Referring now to the drawings, and in particular, FIG. 1, a non-limiting example of a gas turbine engine 10 in the form of a turbofan engine, such as an aircraft propulsion engine, in accordance with an embodiment of the present invention is schematically depicted. Although the present embodiment is described with respect to a turbofan configuration, it will be understood that the present invention is equally applicable to other gas turbine engine configurations, for example, including turbojet engines, turboprop engines, and turboshaft engines.

In the embodiment of FIG. 1, various features, components and interrelationships therebetween of aspects of an embodiment of the present invention are depicted. However, the present invention is not limited to the particular embodiment of FIG. 1 and the components, features and interrelationships therebetween as are illustrated in FIG. 1 and described herein unless specifically provided to the contrary.

In the illustrated embodiment, gas turbine engine 10 includes a fan 12, a compressor 14, a combustor 16, a high pressure (HP) turbine 18, a low pressure (LP) turbine 20, an exhaust nozzle 22 and a bypass duct 24. Combustor 16 is fluidly disposed between compressor 14 and HP turbine 18. LP turbine 20 is drivingly coupled to fan 12 via an LP shaft 26. HP turbine 18 is drivingly coupled to compressor 14 via an HP shaft 28. Although depicted in the form of a two-spool engine, it will be understood that the present invention is equally applicable to three-spool engines or single spool engines.

Each of HP turbine 18 and LP turbine 20 include a plurality of vanes and blades in one or more stages, e.g., HP vanes 30, 32; HP blades 34, 36, LP vanes 38, 40 and LP blades 42, 44. Although two turbine stages are depicted for each of LP turbine 20 and HP turbine 18, it will be understood that the present invention is not limited to any particular number of turbine stages.

During the operation of gas turbine engine 10, air is drawn into the inlet of fan 12 and pressurized by fan 12. Some of the air pressurized by fan 12 is directed into compressor 14, and the balance is directed into bypass duct 24, which directs the pressurized air to exhaust nozzle 22, and which provides a component of the thrust output by gas turbine engine 10. Compressor 14 receives the pressurized air from fan 12, and further pressurizes the air, which is then directed to combustor 16. Fuel is mixed with at least some of the pressurized air in combustor 16, which is then combusted in a combustion liner (not shown). The hot gases exiting combustor 16 are directed into HP turbine 18, which extracts energy from the hot gases via HP vanes 30, 32 and HP blades 34, 36 in the form of mechanical shaft power to drive compressor 14 via HP shaft 28. The hot gases exiting HP turbine 18 are directed into LP turbine 20, which extracts energy via LP vanes 38, 40 and LP blades 42, 44 in the form of mechanical shaft power to drive fan 12 via LP shaft 26. The hot gases exiting LP turbine 20 are directed into nozzle 22, and provide a component of the thrust output of gas turbine engine 10.

Figure 2:
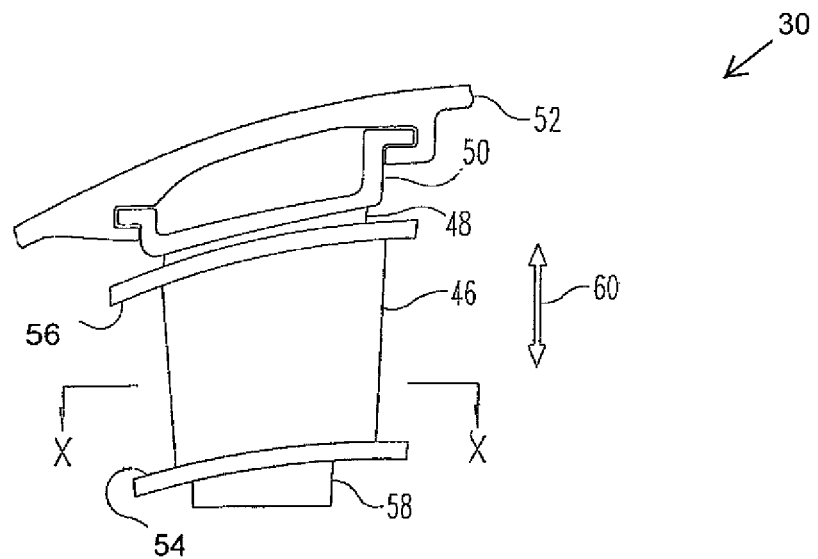
FIG. 2 illustrates a turbine vane in accordance with an embodiment of the present invention.

Referring now to FIG. 2, a non-limiting example of HP turbine vane 30 in accordance with an embodiment of the present invention is depicted. Although FIG. 2 illustrates HP turbine vane 30, i.e., a first stage turbine vane, it will be understood that the present invention is equally applicable to turbine vanes of any turbine stage.

In the embodiment of FIG. 2, various features, components and interrelationships therebetween of aspects of an embodiment of the present invention are depicted. However, the present invention is not limited to the particular embodiment of FIG. 2 and the components, features and interrelationships therebetween as are illustrated in FIG. 2 and described herein unless specifically provided to the contrary.

HP turbine vane 30 of the present embodiment includes a composite airfoil structure 46, a spar 48 and a hanger 50. Hanger 50 is configured to attach HP turbine vane 30 to a static turbine structure, such as, for example, a turbine case 52.

In one form, spar 48 and hanger 50 are metallic and are integral. In other embodiments, spar 48 and hanger 50 may be nonmetallic and/or may not be integral. Spar 48, as the name implies, is a structural component that receives loads, e.g., aerodynamic loads, from composite airfoil structure 46 for transmission to other gas turbine engine 10 structure.

In one form, composite airfoil structure 46 is a ceramic matrix composite (CMC). In other embodiments, other composite materials in addition to or in place of CMC may be employed. For example, in other embodiments, a metal matrix composite (MMC), an organic matrix composite (OMC) and/or other composite materials and/or combinations of composite materials may be employed in addition to or in place of CMC.

In the present embodiment, composite airfoil structure 46 includes an inner endwall 54 and an outer endwall 56. Inner endwall 54 and outer endwall 56 form, in part, inner and outer flowpath walls through vanes 30. In the present embodiment, inner endwall 54 and outer endwall 56 are integral with composite airfoil structure 46, although it will be understood that inner endwall 54 and outer endwall 56 may be separate components in other embodiments. Further, it will be understood that the present invention is not limited to turbine vanes having endwalls, such as inner endwall 54 and outer endwall 56, and that hence, embodiments of the present invention may not include such endwalls.

Spar 48 includes a body 58 that extends through vane 30 in a spanwise direction 60. In one form, spanwise direction 60 is substantially perpendicular to the direction of flow of hot combustion gases through vanes 30. In one form, body 58 extends through vane 30 beyond inner endwall 54 and outer endwall 56. In other embodiments, body 58 may only extend partially through vane 30.

Figure 3:
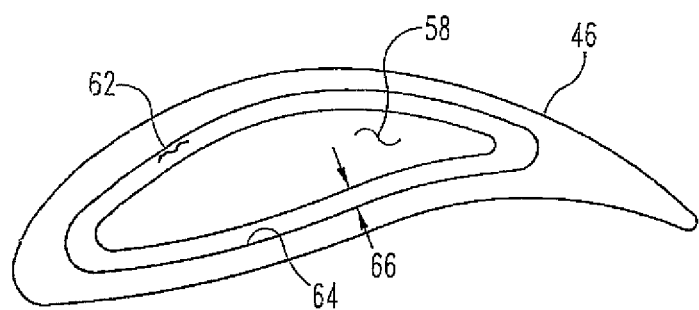
FIG. 3 is a cross-sectional view of the turbine vane embodiment of FIG. 2.

Referring now to FIG. 3, a non-limiting example of an embodiment of the present invention is described in further detail. FIG. 3 is a cross-sectional depiction of an embodiment of the present invention as viewed from section line X-X in FIG. 2.

In the embodiment of FIG. 3, various features, components and interrelationships therebetween of aspects of an embodiment of the present invention are depicted. However, the present invention is not limited to the particular embodiment of FIG. 3 and the components, features and interrelationships therebetween as are illustrated in FIG. 3 and described herein unless specifically provided to the contrary.

Composite airfoil structure 46 includes an opening 62 extending therethrough generally in spanwise direction 60 (approximately perpendicular to the view in FIG. 3). In one form, opening 62 extends through composite airfoil structure 46. In other embodiments, opening 62 may extend only partially through composite airfoil structure 46.

Opening 62 defines an internal surface 64 of vane 30. Body 58 of spar 48 is disposed within opening 62, and defines a gap 66 between body 58 and internal surface 64. In one form, gap 66 extends in a direction approximately perpendicular to spanwise direction 60. In other embodiments, gap 66 may be oriented differently. In one form, gap 66 extends around body 58 and is partially filled by a standoff structure, as described below. The standoff structure extends at least partially around body 58. In one form, composite airfoil structure 46 is releasably disposed on spar 48, e.g., so that composite airfoil structure 46 may be removed from spar 48 and/or the standoff structure for repair or replacement.

Figure 4A:
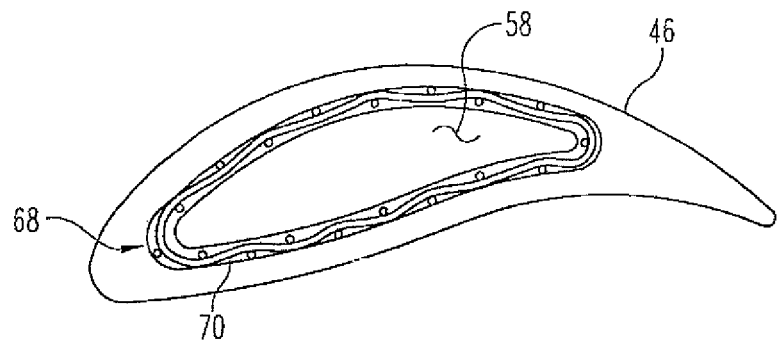
FIGS. 4A and 4B depict aspects of a turbine vane in accordance with an embodiment of the present invention.
Figure 4B:
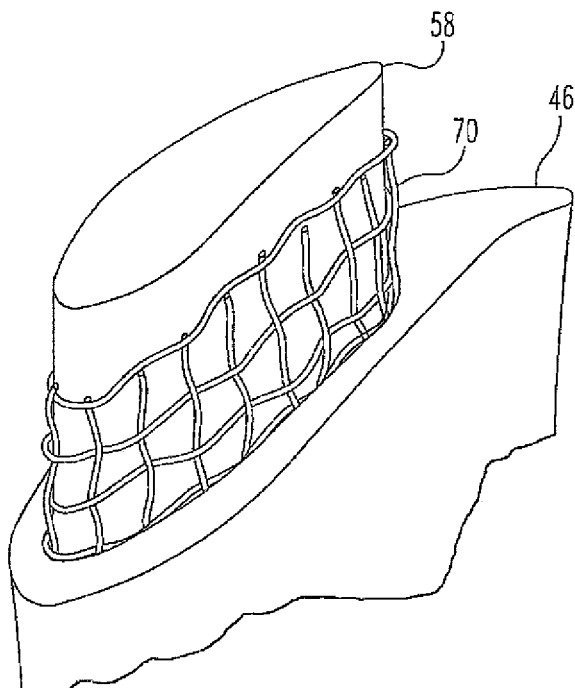

Referring to FIGS. 4A and 4B, a non-limiting example of an embodiment of the present invention having a compliant standoff disposed between body 58 and internal surface 64 is described. FIG. 4A is a cross sectional depiction of an embodiment of the present invention as viewed from section line X-X in FIG. 2.

In the embodiment of FIGS. 4A and 4B, various features, components and interrelationships therebetween of aspects of an embodiment of the present invention are depicted. However, the present invention is not limited to the particular embodiment of FIGS. 4A and 4B and the components, features and interrelationships therebetween as are illustrated in FIGS. 4A and 4B and described herein unless specifically provided to the contrary.

Disposed within gap 66 is a standoff 68. In one form, standoff 68 is operative to transfer aerodynamic loads from composite airfoil structure 46 to turbine case 52. For example, aerodynamic loads imposed on composite airfoil structure 46 are transferred to body 58 of spar 48 through standoff 68. The loads are then transferred from spar 48 to turbine case 52. In other embodiments, other features may transfer aerodynamic loads from composite airfoil structure 46 to spar 48 in addition to or in place of standoff 68.

In the embodiment of FIGS. 4A and 4B, standoff 68 is in the form of a mesh 70 disposed in gap 66. In one form, mesh 70 is a metallic mesh. In other embodiments, other materials, material combinations and configurations may be employed in addition to or in place of mesh 70. In one form, standoff 68 in the form of metallic mesh 70 is a compliant layer between structure 46 and spar 48. Metallic mesh 70 is configured to be sufficiently compliant to compensate for differential thermal expansion between body 58 and composite airfoil structure 46. The compliance of metallic mesh 70 allows metallic mesh 70 to remain in contact with both body 58 and composite airfoil structure 46 through various thermal conditions, such as, for example, between startup and maximum power output of gas turbine engine 10. In one form, metallic mesh 70 is configured to remain in contact with both body 58 and composite airfoil structure 46 throughout the operating regime of gas turbine engine 10. In other embodiments, metallic mesh 70 may be configured to remain in contact with both body 58 and composite airfoil structure 46 during only some gas turbine engine 10 operating conditions. In still other embodiments, standoff 68 may not be compliant.

In one form, metallic mesh 70 is structured as a turbulator that induces turbulence in the cooling air in gap 66, which improves the cooling effectiveness of the cooling air employed to cool surface 64 relative to embodiments that do not employ turbulators. In other embodiments, mesh 70 may not be configured as a turbulator.

Figure 5A:
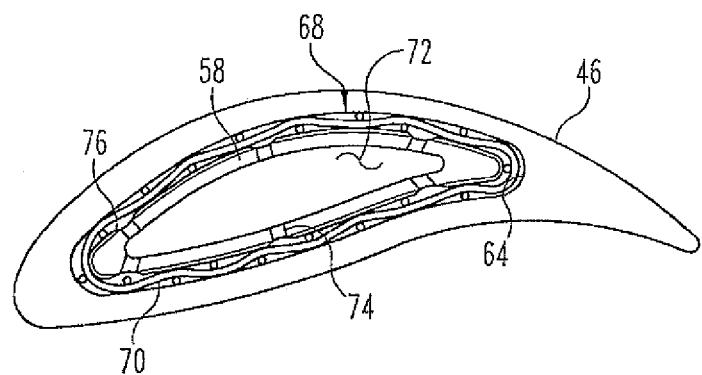
FIGS. 5A and 5B depict aspects of a turbine vane in accordance with another embodiment of the present invention.
Figure 5B:
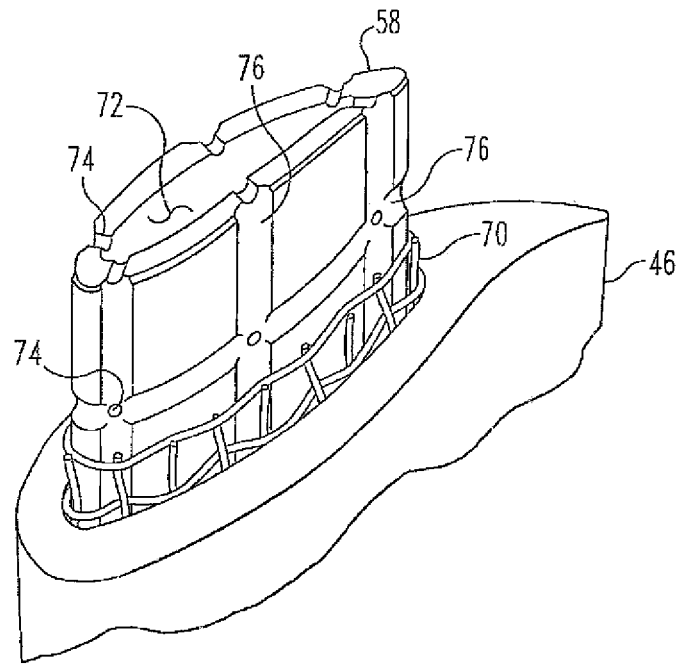

Referring to FIGS. 5A and 5B, another embodiment of the present invention having a compliant standoff disposed between body 58 and internal surface 64 is described. FIG.

5A is a cross sectional depiction of an embodiment of the present invention as viewed from section line X-X in FIG. 2.

In the embodiment of FIGS. 5A and 5B, various features, components and interrelationships therebetween of aspects of an embodiment of the present invention are depicted. However, the present invention is not limited to the particular embodiment of FIGS. 5A and 5B and the components, features and interrelationships therebetween as are illustrated in FIGS. 5A and 5B and described herein unless specifically provided to the contrary.

The embodiment of FIGS. 5A and 5B is somewhat similar to the embodiment of FIGS. 4A and 4B, for example, in that standoff 68 is in the form of a compliant layer, e.g., metallic mesh 70 disposed in gap 66, which functions similar to that as described above with respect to FIGS. 4A and 4B. In the embodiment of FIGS. 5A and 5B body 58 of spar 48 includes a cooling air supply passage 72 that receives cooling air, e.g., from compressor 14, which may or may not be cooled by a heat exchanger. In one form, cooling air supply passage 72 extends in spanwise direction 60 through body 58. In other embodiments, other cooling air supply passage configurations and orientations may be employed. Cooling air supply passage 72 is structured to receive cooling air for the provision of cooling air to spar 48 and composite airfoil structure 46. In other embodiments, cooling air may be supplied via cooling air supply passage 72 to only one of composite airfoil structure 46 and spar 48. Some embodiments may not include a cooling air supply passage, such as cooling air supply passage 72.

Body 58 also includes cooling air supply holes 74 and grooves 76. Cooling air supply holes 74 provide fluid communication between cooling air supply passage 72 and gap 66. In one form, cooling air supply holes 74 provide fluid communication between cooling air supply passage 72 and grooves 76. In one form, grooves 76 function as a distribution manifold that is operative to help distribute throughout gap 66 the cooling air received from cooling air supply holes 74. The cooling air is supplied to internal surface 64 of composite airfoil structure 46 through openings in metallic mesh 70 to provide cooling to composite airfoil structure 46.

Figure 6A:
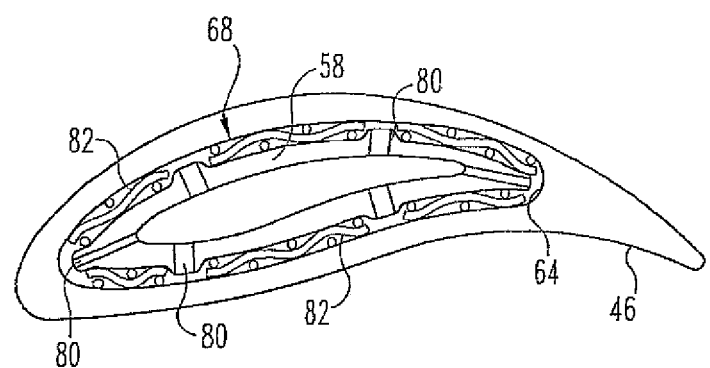
FIGS. 6A and 6B depict aspects of a turbine vane in accordance with yet another embodiment of the present invention.
Figure 6B:
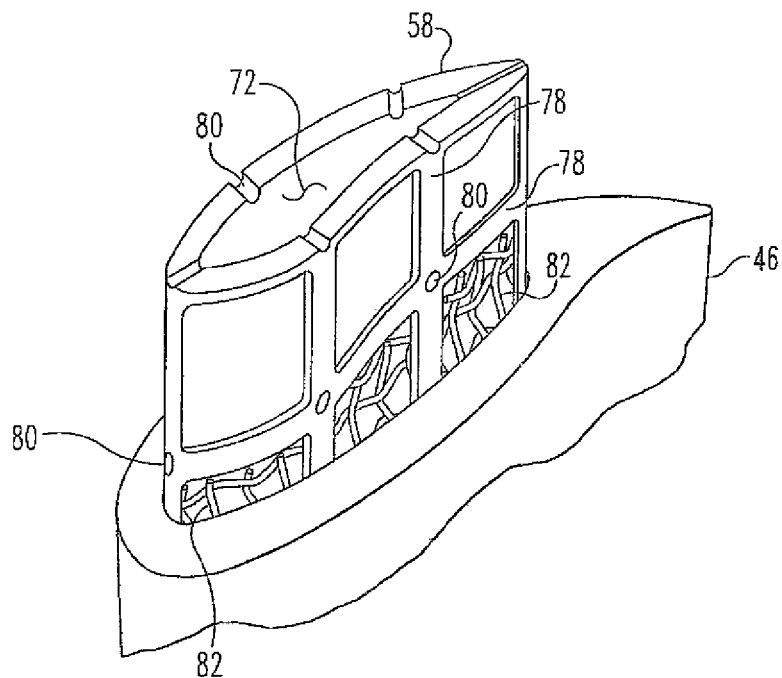

Referring now to FIGS. 6A and 6B, another embodiment of the present invention having a compliant standoff disposed between body 58 and internal surface 64 is described. FIG. 6A is a cross sectional depiction of an embodiment of the present invention as viewed from section line X-X in FIG. 2.

In the embodiment of FIGS. 6A and 6B, various features, components and interrelationships therebetween of aspects of an embodiment of the present invention are depicted. However, the present invention is not limited to the particular embodiment of FIGS. 6A and 6B and the components, features and interrelationships therebetween as are illustrated in FIGS. 6A and 6B and described herein unless specifically provided to the contrary.

The embodiment of FIGS. 6A and 6B is somewhat similar to the embodiment of FIGS. 5A and 5B, for example, in that standoff 68 is in the form of a compliant layer, and that body 58 of spar 48 includes cooling air supply passage 72 and cooling air supply holes. As with the embodiment of FIGS. 5A and 5B, cooling air supply passage 72 receives cooling air for subsequent distribution, e.g., via cooling air supply holes 74, and extends in spanwise direction 60 through body 58. Other cooling air supply passage configurations and orientations may be employed in other embodiments.

In the embodiment of FIGS. 6A and 6B, body 58 of spar 48 includes ribs 78 and cooling air supply holes 80. Ribs 78 extend from body 58 toward composite airfoil structure 46. In one form, cooling air supply holes 80 are impingement cooling holes that direct the cooling air to impinge directly onto composite airfoil structure 46. In other embodiments, other cooling schemes may be employed.

In the embodiment of FIGS. 6A and 6B, standoff 68 is a compliant layer in the form of a plurality of metallic meshes 82 disposed in gap 66. In one form, metallic meshes 82 transfer aerodynamic loads from composite airfoil structure 46 to turbine case 52. In other embodiments, other features may transfer aerodynamic loads in addition to or in place of metallic meshes 82. In one form, standoff 68 is a compliant layer in the form of plurality of metallic meshes 82. In other embodiments, other materials, material combinations and configurations may be used as a compliant layer in addition to or in place of metallic meshes 82. In one form, metallic meshes 82 are structured to be sufficiently compliant to compensate for differential thermal expansion between body 58 and composite airfoil structure 46. In one form, metallic meshes 82 are configured to remain in contact with both body 58 and composite airfoil structure 46 throughout the operating regime of gas turbine engine 10, such as, for example, between startup and maximum power output of gas turbine engine 10. In other embodiments, metallic meshes 82 may be configured to remain in contact with both body 58 and composite airfoil structure 46 during only some gas turbine engine 10 operating conditions.

Figure 7A:
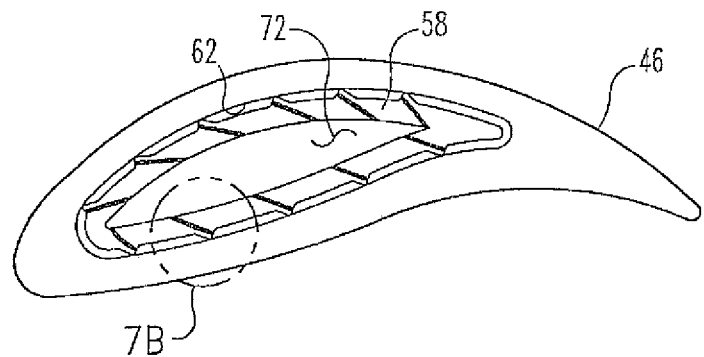
FIGS. 7A and 7B depict aspects of a turbine vane in accordance with still another embodiment of the present invention.
Figure 7B:
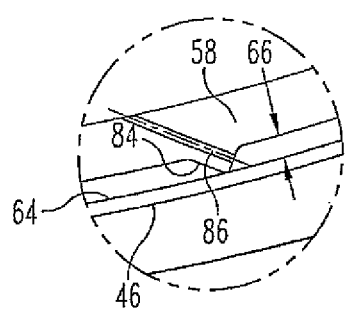
Figure 8:
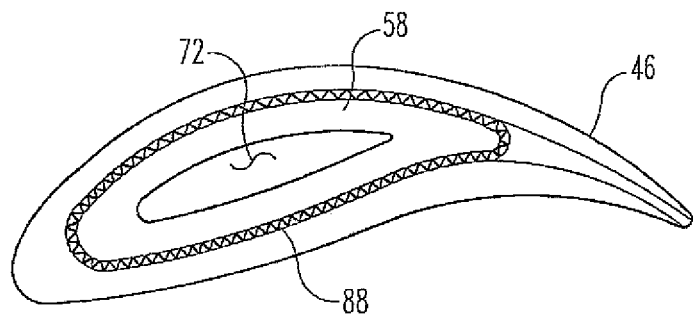
FIG. 8 depicts aspects of a turbine vane in accordance with yet still another embodiment of the present invention.
Figure 9:
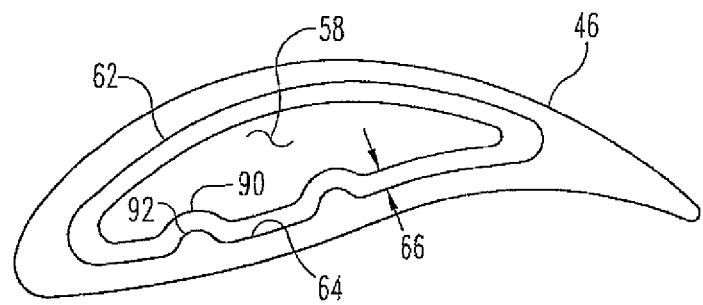
FIG. 9 depicts aspects of a turbine vane in accordance with an additional embodiment of the present invention.

Referring now to FIGS. 7-11, additional embodiments of the present invention are described. FIGS. 7-9 are cross sectional depictions of embodiments of the present invention, e.g., as viewed from section line X-X in FIG. 2.

In the embodiment of FIGS. 7-11, various features, components and interrelationships therebetween of aspects of an embodiment of the present invention are depicted. However, the present invention is not limited to the particular embodiment of FIGS. 7-11 and the components, features and interrelationships therebetween as are illustrated in FIGS. 7-11 and described herein unless specifically provided to the contrary.

In the embodiment of FIGS. 7A and 7B, standoff 68 is in the form of a plurality of bosses 84 integral with and extending from body 58 of spar 48 toward internal surface 64 of composite airfoil structure 46. Each boss 84 includes a cooling air supply hole 86. In one form, cooling air supply holes 86 are impingement cooling holes that direct the cooling air to impinge directly onto internal surface 64 of composite airfoil structure 46. In other embodiments, other cooling schemes may be employed without departing from the scope of the present invention. Some embodiments of the present invention may include bosses 84 without cooling air supply holes 86.

In the embodiment of FIG. 8, a plurality of metal hoops 88 are bonded to internal surface 64 of composite airfoil structure 46, and contact body 58 of spar 48 to provide a compliant standoff 68. For example, metal hoops 88 may be metallic rings that are positioned in gap 66 with the axis of the rings substantially perpendicular to internal surface 64. In other embodiments, hoops 88 may be nonmetallic, and/or may be otherwise affixed or coupled to internal surface 64 of composite airfoil structure 46.

In the embodiment of FIG. 9, body 58 includes a plurality of grooves 90, and internal surface 64 of composite airfoil structure 46 includes a plurality of protrusions 92 that are in alignment with grooves 90. Protrusions 92 serve as standoffs 68. Protrusions 92 extend inward from internal surface 64 toward body 58. In one form, protrusions 92 are integral with composite airfoil structure 46. In other embodiments, protrusions 92 may be formed separately from composite airfoil structure 46 and affixed thereto.

Figure 10:
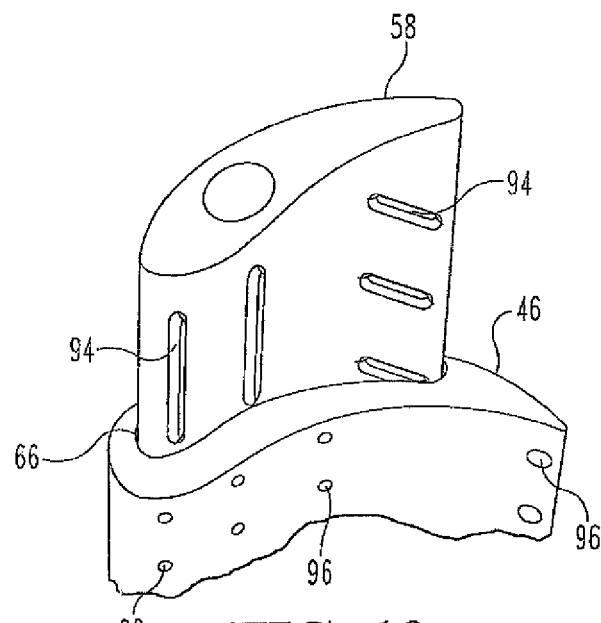
FIG. 10 depicts aspects of a turbine vane in accordance with another additional embodiment of the present invention.

In the embodiment of FIG. 10, standoff 68 is in the form of a plurality of bosses 94 extending from body 58 of spar 48 toward internal surface 64 of composite airfoil structure 46. In one form, composite airfoil structure 46 includes cooling air holes 96, e.g., film cooling holes. Bosses 94 are structured to direct cooling air through gap 66 toward respective cooling air holes 96.

Figure 11:
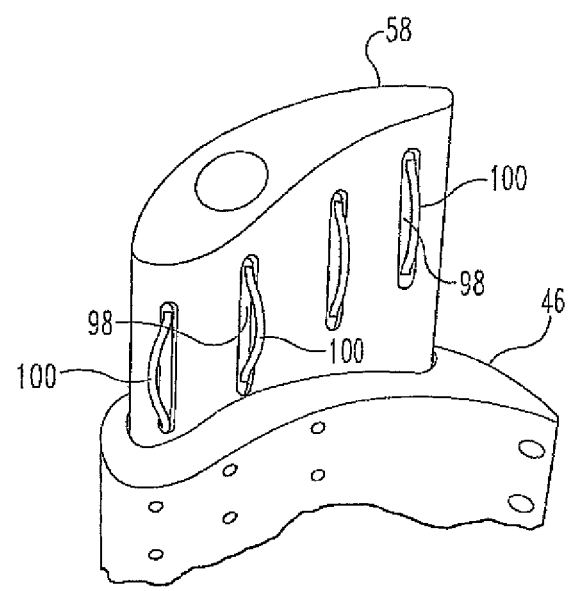
FIG. 11 depicts aspects of a turbine vane in accordance with a yet another additional embodiment of the present invention.

In the embodiment of FIG. 11, body 58 includes a plurality of grooves 98. Standoff 68 is in the form of a plurality of leaf springs 100 extending from body 58 of spar 48 toward internal surface 64 of composite airfoil structure 46. Leaf springs 100 provide a compliant layer in gap 66.

Embodiments of the present invention include a turbine vane for a gas turbine engine. The turbine vane includes a ceramic-matrix composite (CMC) airfoil structure having an opening extending in a spanwise direction therethrough; a metallic spar having a body disposed within the opening and defining a gap between the body and an internal surface of the CMC airfoil structure defined by the opening; and a standoff disposed within the gap, the CMC airfoil structure releasably disposed on the metallic spar.

The standoff may be integral with the metallic spar and extend therefrom toward the internal surface of the CMC airfoil structure. The CMC airfoil structure may have cooling air holes extending therethrough, the standoff structured to direct cooling air to the cooling air holes. The body may include a cooling air supply passage extending at least partially therethrough, the standoff having a cooling air supply hole extending between the cooling air supply passage and the gap.

The standoff may be integral with the CMC airfoil structure and extend therefrom toward the body. The body may include a groove structured to receive the standoff.

The standoff may be in the form of a compliant layer extending around the body. The compliant layer may be in the form of a metallic mesh. The compliant layer may also be in the form of a plurality of metallic meshes, such as where the vane includes a plurality of ribs extending from the body, wherein a metallic mesh of the plurality of metallic meshes is disposed between adjacent ribs of the plurality of ribs. The standoff may also be configured as a turbulator to increase the cooling effectiveness of air used to cool the CMC airfoil structure.

The body may have a cooling air supply passage, a plurality of grooves and a plurality of cooling air supply holes providing fluid communication between the cooling air supply passage and the plurality of grooves, the cooling air supply passage extending at least partially through the body in a spanwise direction.

The standoff may be in the form of a spring extending between the body and the CMC airfoil structure. The body may include a groove structured to receive the spring.

The standoff may be structured to transmit aerodynamic loads from the CMC airfoil structure to a static structure of the gas turbine engine via the body.

The standoff may be structured to compensate for differential thermal expansion between the body and the CMC airfoil structure.

The body may have a cooling air supply passage extending at least partially therethrough, and the body may also have at least one cooling air supply hole providing fluid communication between the cooling air supply passage and the gap, the cooling air supply passage structured to receive cooling air for cooling at least one of the metallic spar and the CMC airfoil structure.

In other embodiments, a turbine vane for a gas turbine engine may include a composite airfoil structure having an opening extending in a spanwise direction at least partially therethrough; a spar having a body disposed within the opening and defining a gap between the body and an internal surface of the composite airfoil structure defined by the opening; and means for spacing the body apart from an internal surface of the composite airfoil structure.

The means for spacing may include means for compensating for differential thermal expansion between the body and the composite airfoil structure. The means for spacing may be compliant. The means for spacing may include means for transferring aerodynamic loads from the composite airfoil structure to the body. The means for spacing may include means for increasing cooling effectiveness.

Yet other embodiments may include an airfoil, including a composite airfoil structure having an opening extending at least partially therethrough in a spanwise direction and structured to releasably receive a body of a spar and to receive means for spacing the body apart from an internal surface of the composite airfoil structure defined by the opening.

Still other embodiments may include a gas turbine engine. The gas turbine engine may include a plurality of turbine vanes, each turbine vane of the plurality of turbine vanes including: a ceramic-matrix composite (CMC) airfoil structure having an opening extending in a spanwise direction therethrough; a metallic spar having a body disposed within the opening and defining a gap between the body and an internal surface of the CMC airfoil structure defined by the opening; and a standoff disposed within the opening, the CMC airfoil structure releasably disposed on the metallic spar.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A turbine vane for a gas turbine engine, comprising:
   a ceramic-matrix composite (CMC) airfoil structure having an opening extending in a span-wise direction therethrough;
   a metallic spar having a body disposed within said opening and defining a gap between said body and an internal surface of said CMC airfoil structure defined by said opening;
   wherein said body includes:
      a cooling air supply passage extending at least partially therethrough;
      at least one standoff disposed within said gap protruding radially outward from said body and defining a region of increased cross sectional thickness of the body;

at least one through hole extending from said cooling air supply passage through the at least one standoff;

wherein said CMC airfoil structure is releasably disposed on said metallic spar; and wherein the standoff includes two planar surfaces extending outward from the body at angles relative to adjacent portions of the body.

2. The turbine vane of claim 1, wherein said standoff is integral with said metallic spar and extends therefrom toward the internal surface of said CMC airfoil structure.

3. The turbine vane of claim 1, wherein said standoff is structured to direct cooling air into a gap between the body and the CMC airfoil structure.

4. The turbine vane of claim 1, wherein said standoff contacts said CMC airfoil structure.

5. The turbine vane of claim 1, the at least one hole extends into the body of the metallic spar from one of the two planar surfaces.

6. The turbine vane of claim 5, wherein the at least one hole extends into the body of the metallic spar in a direction substantially perpendicular to said one of the two planar surfaces.

7. The turbine vane of claim 5, wherein the at least one hole extends into the body of the metallic spar in a direction substantially parallel to the other of the two planar surfaces.

8. The turbine vane of claim 1, wherein said standoff extends at least partially around said body.

9. The turbine vane of claim 1, wherein said standoff is rigid.

10. The turbine vane of claim 1, wherein said at least one through hole is an impingement cooling hole that directs cooling air to impinge directly onto an internal surface of the composite airfoil structure.

11. The turbine vane of claim 1, wherein the at least one hole extends into the body of the metallic spar at an angle such that the hole extends through a first portion of the body including the standoff and a second portion of the body not including the standoff.

12. The turbine vane of claim 1, wherein the body includes a plurality of standoffs disposed within said gap protruding radially outward from said body and defining a plurality of regions of increased cross sectional thickness of the body, and a plurality of through holes extending through respective ones of said plurality of standoffs.

13. The turbine vane of claim 1, wherein said standoff is structured to transmit aerodynamic loads from said CMC airfoil structure to a static structure of said gas turbine engine via said body.

14. A turbine vane for a gas turbine engine, comprising:
a composite airfoil structure having an opening extending in a spanwise direction at least partially therethrough;
a spar having a body disposed within said opening and defining a gap between said body and an internal surface of said composite airfoil structure defined by said opening;
a standoff protruding radially outward from the spar into the gap for spacing said body apart from an internal surface of said composite airfoil structure, the standoff including two planar surfaces extending outward from the body at angles relative to adjoining portions of the body;
a cooling hole extending from one of the two surfaces through the standoff to provide cooling air from a cooling air source to the composite airfoil structure; and
wherein said composite airfoil structure is releasably disposed on said spar.

15. The turbine vane of claim 14, wherein said standoff defines a region of increased thickness of the body of the metallic spar.

16. The turbine vane of claim 14, wherein said standoff is rigid.

17. The turbine vane of claim 14, wherein said standoff includes means for transferring aerodynamic loads from said composite airfoil structure to said body.

18. An airfoil, comprising:
a composite airfoil structure having an opening extending at least partially therethrough in a spanwise direction and structured to releasably receive a body of a spar and to receive means for spacing said body apart from an internal surface of said composite airfoil structure defined by said opening, wherein the means for spacing includes a wire mesh having a first plurality of wires extending in one direction and a second plurality of wires extending across the first plurality of wires, the first plurality of wires passing alternately above and below sequential ones of the second plurality of wires.

19. The turbine vane of claim 18, wherein the second plurality of wires pass alternately above and below sequential ones of the first plurality of wires.

20. A gas turbine engine comprising:
a plurality of turbine vanes, each turbine vane of said plurality of turbine vanes including:
a ceramic-matrix composite (CMC) airfoil structure having an opening extending in a spanwise direction therethrough;
a metallic spar having a body disposed within said opening and defining a gap between said body and an internal surface of said CMC airfoil structure defined by said opening;
a turbulator positioned in the gap to induce turbulence in cooling air passing through said gap, the turbulator including an elongate member with arcuate portions extending toward the metallic spar and the composite airfoil structure in alternating fashion; and
wherein said CMC airfoil structure is releasably disposed on said metallic spar.

21. The gas turbine engine of claim 20, wherein said turbulator is further defined by a plurality of first resilient members extending in a first direction and plurality of second resilient members extending across the plurality of first resilient members in a different direction.

* * * * *